United States Patent [19]

De Witte

[11] Patent Number: 4,741,781

[45] Date of Patent: May 3, 1988

[54] IRON OXIDE PIGMENT SUSPENSIONS AND SLURRIES

[75] Inventor: Hans J. De Witte, Pittsburgh, Pa.

[73] Assignee: Mobay Corporation, Pittsburgh, Pa.

[21] Appl. No.: 924,544

[22] Filed: Oct. 29, 1986

[51] Int. Cl.$^4$ .............................................. C04B 14/00
[52] U.S. Cl. .................................... 106/304; 106/306; 106/308 R
[58] Field of Search ................... 106/304, 308 R, 306

[56] References Cited

U.S. PATENT DOCUMENTS

| | | | |
|---|---|---|---|
| 3,619,227 | 7/1968 | Tomkinson | 106/304 |
| 3,663,284 | 5/1972 | Stancloff et al. | 106/300 |
| 4,201,762 | 5/1980 | Daly | 106/304 |
| 4,204,876 | 5/1980 | Bowden | 106/90 |
| 4,374,677 | 2/1983 | Senda et al. | 106/304 |
| 4,569,920 | 2/1986 | Smith-Johannsen | 501/1 |
| 4,618,375 | 10/1986 | Patel et al. | 106/304 |

*Primary Examiner*—Paul Lieberman
*Assistant Examiner*—Willie J. Thompson
*Attorney, Agent, or Firm*—Gene Harsh; Joseph C. Gil; Lyndanne M. Whalen

[57] ABSTRACT

Iron oxide slurries and suspensions are made from water, iron oxide pigments and a dispersing agent which is water soluble salt of citric acid or tartaric acid. The preferred dispersing agents are the ammonium, sodium and potassium salts of citric acid and tartaric acid. The sodium salts of citric acid are particularly preferred. A known additive such as a fungicide may be included. To keep the slurries and suspension from settling, stabilizing agents may also be included.

17 Claims, No Drawings

IRON OXIDE PIGMENT SUSPENSIONS AND SLURRIES

BACKGROUND OF THE INVENTION

The present invention relates to aqueous suspensions and slurries of iron oxide pigments.

In the manufacture of colored concrete products such as interlocking concrete pavers, concrete blocks, concrete roofing tiles, etc., the color is often imparted by using pigment suspensions or slurries. Use of such suspensions and slurries makes it easier under certain circumstances (e.g., inadequate concrete mixer) to mix the pigment with the concrete to obtain a homogeneous color. The use of a liquid rather than a powdery pigment composition results in less dust and less of a nuisance to construction workers.

Because iron oxide pigments are available in shades ranging from yellow to orange to red to brown to black, iron oxide slurries and suspensions are commonly used in coloring applications. However, the pigments in the available slurries and suspensions tend to settle out upon standing. It is therefore necessary to remix the slurry or suspension before use to ensure homogeneity of color. Such remixing is not however always readily accomplished due to the pseudoplastic nature of the slurry.

Concentrated slurries and dispersions of iron oxides are economically advantageous because they occupy a smaller volume and require less storage space than more dilute slurries and dispersions. However, there is a limit to solids concentration beyond which the dispersion ceases to be fluid. It would therefore be economically advantageous to raise this limit of solids concentration as high as possible.

SUMMARY OF THE INVENTION

It is an object of the present invention to provide a suspension or slurry of iron oxide pigments characterized by a higher solids content and/or lower viscosities than the known suspensions and slurries.

It is also an object of the present invention to provide an iron oxide suspension or slurry which when added to a material such as concrete imparts a homogeneous color to that material.

These and other objects which will be apparent to those skilled in the art are accomplished by including 0.05-1.4 wt. % of a water soluble salt of citric acid or tartaric acid, preferably a salt selected from the sodium, potassium and ammonium salts of citric acid and tartaric acid in an iron oxide suspension or slurry

DETAILED DESCRIPTION OF THE INVENTION

The present invention relates to iron oxide suspensions and slurries. Such suspensions and slurries are generally composed of water, iron oxide pigment, a fungicide and a dispersing agent. In the present invention, any iron oxide pigment and any fungicide may be employed. The dispersing agent must however be a water soluble salt of citric acid or tartaric acid. Suitable dispersing agents include the sodium, potassium and ammonium salts of citric acid or tartaric acid. The citric acid salts are preferred. These dispersing agents are available commercially. They are also readily made by simple acid-base reactions.

In suspensions and slurries of this type, water is generally present in a quantity of from 24 to 70 wt. %. (based on total slurry), preferably from 24 to 60 wt. % and the iron oxide pigment is present as 40-75 wt. % of the slurry. The preferred amount of iron oxide pigment depends upon the specific pigment being used. For example, nonmicronized yellow iron oxide pigments are preferably used in an amount of from 50 to 60 wt. % of the total slurry. Micronized yellow iron oxide pigments are preferably 50 to 65 wt. % of the total slurry. Nonmicronized or micronized red iron oxide pigments are preferably used in a quantity of from 50 to 75 wt. % of the total slurry. Preferred slurries made from micronized or nonmicronized black iron oxide pigments preferably contain from 40 to 65 % pigment.

A fungicide is not necessary in the slurries and dispersions of the present invention if the slurry or suspension is to be used shortly after its production. It is recommended however, that a fungicide be included because these slurries and suspensions are generally stored for longer than two weeks. The fungicide, if used, is generally included in a quantity of from 0.1 to 0.2 wt. % of the total slurry. Although larger quantities of fungicide could be used, such large quantities do not improve the suspension or slurry significantly enough to justify their expense.

Any of the commercially available fungicides may be used in the practice of the present invention. Examples of suitable fungicides include aqueous solutions of 4,4-dimethyloxazolidine and its trimethyl homolog and the arylmethanol mono(poly) semi formal sold under the trademark Preventol by Bayer AG.

Dispersing agents useful in the present invention include alkali and ammonium salts and acid salts of citric acid and the tartaric acid. The sodium, potassium and ammonium salts of citric acid and tartaric acid in their various states of hydration (i.e. dihydrates, pentahydrates, and 5,5-hydrates) are preferred. The salts of citric acid are more preferred. Mixtures of these salts may be used but are not preferred. Trisodium citrate dihydrate is the most preferred dispersing agent.

The citric acid based and tartaric acid based dispersing agents are generally used in a quantity of from 0.05 to 1.4 wt. %, preferably from 0.057 to 0.88 wt. % of the total slurry. The amount of dispersing agent used is dependent upon the amount of pigment in the slurry or suspension and on the active substance in the dispersant being used. For example, trisodium citrate dihydrate contains between 10 and 13% water. Consequently, only about 88.5% (on average) of a measured amount of trisodium citrate dihydrate is trisodium citrate. A 50% red iron oxide slurry in which 0.1% trisodium citrate dihydrate (based on pigment) is present actually contains 0.057% active substance $$\left( \text{i.e. } \frac{50 \times 100 \times 0.1}{88.5 \times 100} \right),$$

based on the total slurry by weight.

The amount of dispersing agent used is also dependent upon the hardness of the water being used to make the slurry or dispersion. The harder the water, the larger the amount of dispersing agent.

The optimum amount of dispersing agent is dependent upon the particular iron oxide pigment employed and the solids content of the suspension or slurry. Red iron oxides do not generally require a dispersing agent until the solids content is higher than 50% whereas yellow iron oxides require a dispersing agent at solids contents above 40%. The particle size of the pigment is also significant with respect to the amount of dispersing agent employed. For example, micronized pigments are more easily dispersed than larger particle size pigments. Consequently, less dispersing agent is required in the present invention when the suspension or slurry is made with micronized pigments than when pigments having larger particle sizes are used.

Although it is theoretically possible to use excess quantities of dispersing agent, such excess does not significantly improve the pigment dispersion in the suspensions and slurries of the present invention.

In addition to the water, iron oxide, fungicide and dispersing agent, the suspensions and slurries of the present invention may also include conventional thickeners which act as stabilizing agents to deter sedimentation. Any known stabilizer may be used in the practice of the present invention. Appropriate stabilizers include: xanthan gum, alginates, modified starches, gum arabic, carboxy methyl cellulose, guar gum, gum tragacanth, locust bean gum, etc. Xanthan gum is preferred because it is extremely effective and can therefore be used in relatively small amounts (i.e. from 0.075 to 0.2 wt. %, preferably from 0.1 to 0.2 wt. % of the total slurry or dispersion). Stabilizers which are less effective than xanthan gum must be used in larger quantities which quantities may be as high as 10% of the slurry, preferably no more than 5%.

The chelating or sequestering agents used in making suspensions or slurries with other pigment materials such as titanium dioxide are unnecessary in the iron oxide suspensions and slurries of the present invention because the citric acid or tartaric acid from the dispersing agent in water functions as a chelating agent.

In some cases, it may be necessary or desirable to add a base to adjust the pH of the slurry. For example, the pH of a black iron oxide pigment slurry may be too low for certain applications. The pH of a slurry made with such a black iron oxide pigment and trisodium citrate may be as low as 5.0. Such pH is too low for use with materials such as carbon steel because it may cause a corrosion problem. In such cases, it would be desirable to adjust the pH of the slurry to a pH of over 7.0 but not higher than 9.5. This adjustment may be accomplished by adding an appropriate amount of sodium hydroxide (e.g. 0.1–0.2 wt. % solid NaOH). Other methods and materials suitable for such pH adjustments are known to those in the art.

The suspensions and slurries of the present invention may be readily made by combining water, iron oxide, an optional fungicide, dispersing agent and other additives in any manner. The dispersing agent should however be added to the water before the pigment is added to the water.

The invention is further illustrated but is not intended to be limited by the following examples in which all parts and percentages are by weight unless otherwise specified.

EXAMPLES

EXAMPLES 1–10

Iron oxide slurries were prepared by adding and mixing the amount of stabilizing agent and/or dispersing agent indicated in the following Table 1 to the indicated amount of water. The indicated amount of the specified pigment was then added to this mixture and stirred. The quantities given in Table 1 are weight percents based on the total slurry.

EXAMPLES 11–14

Iron oxide slurries were prepared by adding and mixing the amount of stabilizing agent and/or dispersing agent indicated in the following Table II to the indicated amount of water. The indicated amount of the specified pigment was then added to this mixture and stirred. The quantities given in Table II are weight percents based on the total slurry.

TABLE I

| Example | Water | Xanthan Gum | Trisodium Citrate Dihydrate | Pigment | % Solids | Storage Stability |
|---|---|---|---|---|---|---|
| 1 | 34.07 | 0.20 | 0.73 | 65.00$^A$ | 65.85 | approx 2 months |
| 2 | 39.12 | 0.20 | 0.68 | 60.00$^B$ | 60.80 | approx 2 months |
| 3 | 34.64 | 0.10 | 0.26 | 65.00$^C$ | 65.33 | >6 months |
| 4 | 34.53 | 0.10 | 0.37 | 65.00$^D$ | 65.43 | >6 months |
| 5 | 39.09 | 0.10 | 0.81 | 60.00$^E$ | 60.82 | approx 3 months |
| 6 | 49.77 | 0 | 0.23 | 50.00$^B$ | 50.20 | settle out upon standing easily redispersible |
| 7 | 49.943 | 0 | 0.057 | 50.00$^C$ | 50.05 | |
| 8 | 49.915 | 0 | 0.085 | 50.00$^D$ | 50.08 | |
| 9 | 49.58 | 0 | 0.42 | 50.00$^E$ | 50.37 | |
| 10 | 34.12 | 0 | 0.88 | 65.00$^F$ | 65.78 | |

$^A$Yellow iron oxide, micronized, particle size = .1 × .4 microns
$^B$Yellow iron oxide, non-micronized, particle size = .1 × .7 microns
$^C$Red iron oxide, non-micronized, particle size = 0.09 microns
$^D$Red iron oxide, non-micronized, particle size = 0.17 microns
$^E$Black iron oxide, non-micronized, particle size = 0.1 microns
$^F$Black iron oxide, micronized, particle size = 0.2 microns

TABLE II

| Example | Water | Xanthan Gum | Sodium Tartrate Dihydrate | Pigment | % Solids | Storage Stability |
|---|---|---|---|---|---|---|
| 11 | 50.21 | 0 | 1.59 | 48.20$^A$ | 49.58 | Settle out upon standing, easily re-dispersible |
| 12 | 34.57 | 0 | 0.43 | 65.00$^D$ | 65.37 | |
| 13 | 44.10 | 0 | 0.90 | 55.00$^E$ | 55.77 | |
| 14 | 41.73 | 0 | 1.27 | 57.00$^F$ | 58.10 | |

$^A$Yellow iron oxide, micronized, particle size = .1 × .4 microns
$^D$Red iron oxide, nonmicronized, particle size = 0.17 microns
$^E$Black iron oxide, nonmicronized, particle size = 0.1 microns
$^F$Black iron oxide, micronized, particle size = 0.2 microns Although the invention has been described in detail in the foregoing for the purpose of illustration, it is to be understood that such detail is solely for that purpose and that variations can be made therein by those skilled

What is claimed is:

1. An iron oxide pigment-suspension or slurry comprising
   (a) 24-70 wt. % water,
   (b) 0.05-1.4 wt. % of an additive selected from water soluble salts of citric acid and tartaric acid and,
   (c) 40-75 wt. % iron oxide pigment in which the sum of (a), (b), and (c) is approximately 100 wt. %.

2. The suspension or slurry of claim 1 in which (b) is selected from the sodium, potassium and ammonium salts of citric acid and tartaric acid.

3. The suspension or slurry of claim 2 in which up to 10 wt. % of a stabilized is included.

4. The suspension or slurry of claim 3 in which the stabilizer is xanthan gum.

5. The suspension or slurry of claim 4 in which (b) is trisodium citrate dihydrate.

6. The suspension or slurry of claim 1 in which (b) is trisodium citrate dihydrate.

7. The suspension or slurry of claim 1 in which xanthan gum is included.

8. The suspension or slurry of claim 1 in which up to 10 wt. % stabilizer is included.

9. The suspension or slurry of claim 1 which further includes 0.1-0.2 wt. % fungicide.

10. The suspension or slurry of claim 1 in which 50-65 wt. % yellow iron oxide pigment is present as (c).

11. The suspension or slurry of claim 1 in which 50-75 wt. % red iron oxide pigment is present as (c).

12. The suspension or slurry of claim 1 in which 40-65 wt. % black iron pigment is present as (c).

13. A stabilized oxide slurry or suspension comprising
   (a) 24-60 wt. % water,
   (b) 0.057-0.88 wt. % of an additive selected from sodium, potassium and ammonium salts of citric acid,
   (c) 0.1-0.2 wt. % of fungicide,
   (d) 0.075-0.2 wt. % xanthan gum and
   (e) 50.0-65.0 wt. % yellow iron oxide pigment
   in which the sum of (a), (b). (c), (d) and (e) is approximately 100 wt. %.

14. The slurry or suspension of claim 13 in which (b) is trisodium citrate dihydrate.

15. A stabilized iron oxide slurry or suspension comprising
   (a) 24-60 wt. % water,
   (b) 0.057-0.88 wt. % of an additive selected from sodium, potassium and ammonium salts of citric acid,
   (c) 0.1-0.2 wt. % fungicide,
   (d) 0.075-0.2 wt. % xanthan gum and
   (e) 50.0-75.0 wt. % red iron oxide
   present in quantities such that the sum of (a), (b), (c), (d), and (e) is approximately 100 wt. %.

16. The slurry of claim 15 in which (b) is trisodium citrate dihydrate.

17. The iron oxide pigment suspension or slurry of claim 1 in which iron oxide pigment (c) is a red iron oxide pigment.

* * * * *